United States Patent
Allan et al.

(10) Patent No.: US 6,838,418 B2
(45) Date of Patent: Jan. 4, 2005

(54) FRACTURING FLUID

(75) Inventors: Travis L. Allan, Calgary (CA); Junad Amin, Calgary (CA); Alan K. Olson, Strathmore (CA); Ronald G. Pierce, Calgary (CA); Dwight M. Bobier, Calgary (CA)

(73) Assignees: Calfrac Well Services Ltd., Calgary (CA); Chemergy Ltd., Calgary (CA)

( * ) Notice: Subject to any disclaimer, the term of this patent is extended or adjusted under 35 U.S.C. 154(b) by 1 day.

(21) Appl. No.: 09/966,750

(22) Filed: Oct. 1, 2001

(65) Prior Publication Data

US 2002/0065359 A1 May 30, 2002

(51) Int. Cl.[7] ............................................... C09K 3/00
(52) U.S. Cl. ..................... 507/224; 507/202; 507/276; 507/277; 507/922; 507/921
(58) Field of Search .................. 507/202, 224, 507/276, 277, 922, 921, 244; 166/308.2, 308.3, 308.5, 308

(56) References Cited

U.S. PATENT DOCUMENTS

| | | | | |
|---|---|---|---|---|
| 3,654,994 A | * | 4/1972 | Slagel et al. | 166/308 |
| 3,704,750 A | * | 12/1972 | Miles et al. | 166/279 |
| 3,841,402 A | * | 10/1974 | Knight et al. | 166/247 |
| 3,845,824 A | * | 11/1974 | Tinsley | 166/308 |
| 4,647,385 A | * | 3/1987 | Williams | 507/224 |
| 4,711,731 A | * | 12/1987 | Garvey et al. | 507/224 |
| 5,224,543 A | * | 7/1993 | Watkins et al. | 166/279 |
| 5,424,285 A | * | 6/1995 | Stacy et al. | 507/202 |
| 5,618,780 A | * | 4/1997 | Argillier et al. | 507/224 |

* cited by examiner

Primary Examiner—Philip C. Tucker
(74) Attorney, Agent, or Firm—Hoffman, Wasson & Gitler, P.C.

(57) ABSTRACT

There is described a fracturing fluid comprising a polar base, 0.1–5.0% of a mid-molecular weight polyacrylate, and an activator for ionizing the polyacrylate to a hydroscopic state.

57 Claims, 2 Drawing Sheets

FRACTURING FLUID

FIELD OF THE INVENTION

The present invention relates to the field of fracturing fluids for oil and gas well stimulation.

BACKGROUND OF THE INVENTION

The term fracturing fluid refers to fluids utilized for injection at high pressure into oil or gas wells, to fracture the geological formations surrounding the wells, and thereby increase the porosity of same. This permits more efficient flow of hydrocarbons in the formation and thereby increases the productivity of the well.

The primary function of a fracturing fluid is two-fold: first to transmit energy generated at surface down a well bore to hydraulically create a fracture within reservoir rock, and secondly, to transport a propping agent (usually sand) from surface to the reservoir to ensure conductivity generated by the fracture is preserved. Since this process involves the introduction of a foreign fluid into the porosity of the reservoir near the fracture face, removal of the fluid can be a critical component to the success of the treatment. Once the fluid is removed, or its effects minimized, a successful stimulation has a pipeline placed connecting the reservoir to the well bore and increased the productive economics of the well.

A hydraulic fracturing treatment consists of three main stages. Initially a "Hole Fill/Pad" stage is pumped to initiate the fracture and create width for the stages to follow. It consists of water treated with a viscosifier and a breaker added at various concentrations, depending primarily on the temperature of the reservoir to be fractured. After a sufficient volume of Pad has been pumped (typically 10–40 m3), proppant is added to the fluid stream to form the "Slurry" stage. Concentrations of the proppant (sand, resin-coated sand, or ceramics) are kept low at the beginning and slowly ramped up to maximum values, which vary as a function of depth, fracturing pressures, and reservoir type. An optimization process utilizing numerical and analytical simulation models determines the amount of proppant that is pumped. Once the appropriate volume of proppant has been mixed by the blender and pumped down the well bore, a "Flush" stage consisting of water, sometimes with viscosifier and breaker, is used to displace the "Slurry" stage to the perforations.

Treatment design is based on several parameters that include, but are not limited to, reservoir permeability, pressure, depth, temperature and reservoir fluid type. Fracture fluid viscosity, down-hole injection rate, proppant size and type, proppant volume and concentration are all important aspects of the final stimulation program. Engineering modeling tools, together with previous field experience gained in each area are used in a combined approach to formulate the best possible stimulation design for the reservoir.

A desirable feature in a fracturing fluid is variable viscosity. That is, fluids will frequently contain additives that can be selectively altered, chemically or physically, to increase or decreases the viscosity of the fluid. The reason a high viscosity is desired is for the transport of proppant, such as sand granules into a fractured formation to prevent cracks and pores made by the fracturing process in the formation from closing. However, after that process is complete, it is desirable to lower the viscosity of the fluid, so that it can be pumped back out of the well without carrying the proppant granules with it.

A typical fracturing fluid will contain, for instance, guar with an average molecular weight of 2,000,000, which can be rapidly cross-linked by the addition of an activator such as a metal borate and broken by the use of an oxidizer such as a persulfate or peroxide.

A potential drawback of viscosification systems involving covalent chemical bonds is that the reactions involved in breaking the gel have thermal consequences, which are often not desirable. Moreover, such reactions are influenced by prevailing thermal conditions.

SUMMARY OF THE INVENTION

The present invention utilizes a lower (about 500,000) molecular weight polyacrylic acid polymer, which upon activation by treatment with an activator such as an inorganic base, an amine, or a temperature rise above 70° C. in a polar solvent like water or methanol ionizes and hydrates to form a viscous gel. Moreover, since conjugation reactions proceed almost instantaneously, there is no lag between addition of an activator, preferably thriethanolamine, and conjugation of the carboxyl groups on the polyacrylic acid chains. Hydration is also very rapid, resulting in a fast formation of a three dimensional gel structure that swells to up to 1000 times the original volume of the acrylic acid.

DETAILED DESCRIPTION

In a preferred embodiment, the present invention is an emulsified fluid utilizing Carbon dioxide ($CO_2$) as the internal phase surrounded by gelled mid molecular weight polyacrylate water/methanol as the external phase. This is accomplished by adding Carbon dioxide ($CO_2$) under high pressure to the fluid stream near the wellhead. The amount of $CO_2$ that added is dependent mainly on the desired emulsion quality and down-hole proppant concentrations. The system of the present invention is capable of producing a stable fracturing fluid for carrying and transporting proppant to the hydraulic fracture.

The fracturing fluid is designed to have sufficient properties to create the hydraulic fracture, transport the proppant into the formation and then breakdown to a low viscosity flow-back fluid. The system of the present invention is designed to place the proppant, break to low viscosity and flow back quickly and efficiently. The cleaner the fracturing system breaks, the higher the retained conductivity of the fracture pack, and the more a well is able to flow back the injected fluid. A quick clean up ensures that a well can be put on production without delay. The system of the present invention has a controlled break and efficient clean up by shortening the flow back time when compared to conventional long-chain polymer systems.

Moreover, the gel of the present invention can be broken very quickly with the addition of salts such as NaCl or KCl, or by adding inorganic/organic salts, since any of these techniques will affect the ionic nature of the polymer.

The breaker is preferably encapsulated, by known techniques, to allow it to be transported to the fracture site easily.

Preferably, the present invention uses a polyacrylic acid polymer that has been further cross-linked with polyalkenyl ethers or di-vinyl glycol resulting in an unactivated particle having a size of about 0.2 microns. Upon activation with, preferably, triethanolamine in water or methanol, the flocculated particles will swell to approximately 2–7 microns.

In a broad aspect, therefore, the present invention relates to a fracturing fluid comprising a polar base, 0.1–5.0% of a mid-molecular weight polyacrylate, and an activator for ionizing said polyacrylate to a hygroscopic state.

Depending on the polymer loading, a base viscosity of 20–200 cP@511s$^{-1}$ can be achieved with the present invention. However, if it is desired to use a foam depending on the application ($N_2$ air or $CO_2$, 50–52% to 94–95% quality) viscosity of the foam is 20–300 cP@100s$^{-1}$. Similar viscosity is obtained if 50–52 to 94–95% liquid $CO_2$ is utilized in an emulsion (with an ethoxylated alkylphenol surfactant in a minor quantity). Up to 50% $N_2$ or $CO_2$ will not form an effective emulsion, but will serve to energize the fluid.

To formulate a fracturing fluid according to the present invention, the following quantities may be used:

| | |
|---|---|
| gelling agent-polyacrylate: | 0.1–5.0% (wt) |
| activator-triethanolamine: | 0.1–5.0% (wt) |
| breaker-encapsulated alkyline earth metal salts such as CaO, MgO, KCl, etc: | 0.01–1.0% (wt) |
| base-water or methanol: | Remainder to 100% |

Other bases that may be used include ethanol, propanol and isopropanol.

Other activators that may be used include NaOH, KOH, $NH_4OH$, and the like. Other breakers may be used including organic/inorganic salts, and other electrolytes.

BRIEF DESCRIPTION OF THE DRAWINGS

The rapid hydration and subsequent breaking of the fluids of the present invention are illustrated in the graphs attached as FIGS. 1 and 2.

Figure 1:
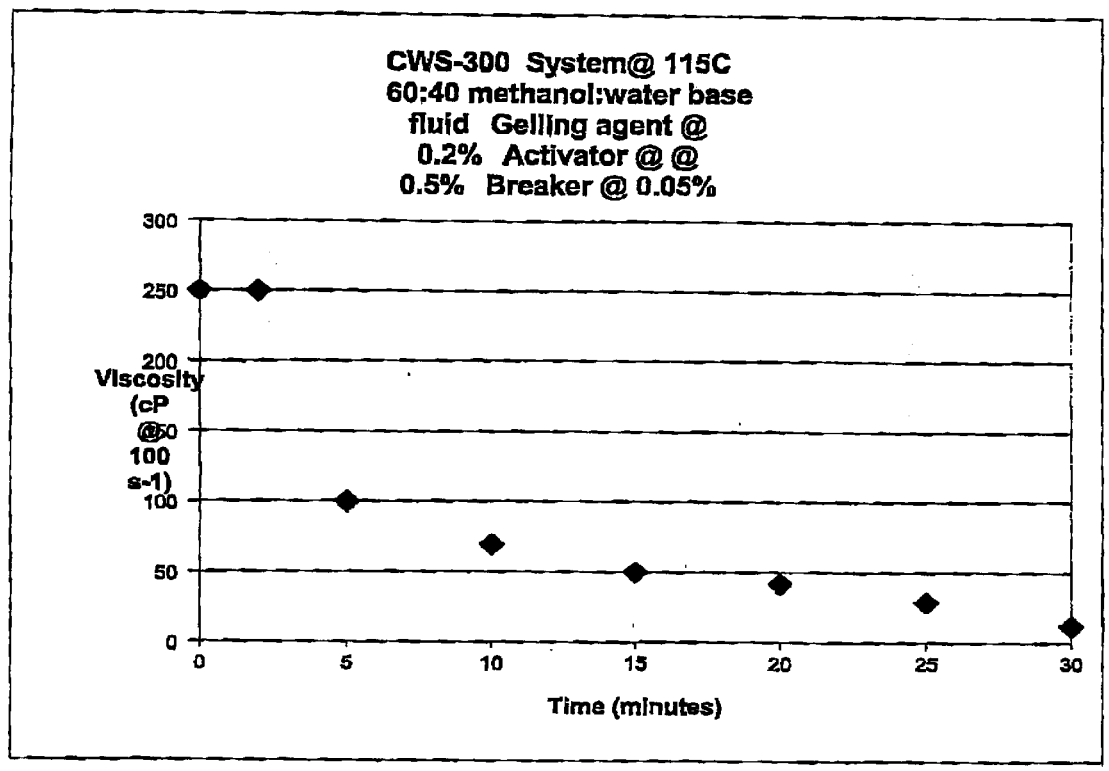
FIG. 1 is a plot of viscosity against time of the fluid of the present invention, with an encapsulated breaker added thereto.
Figure 2:
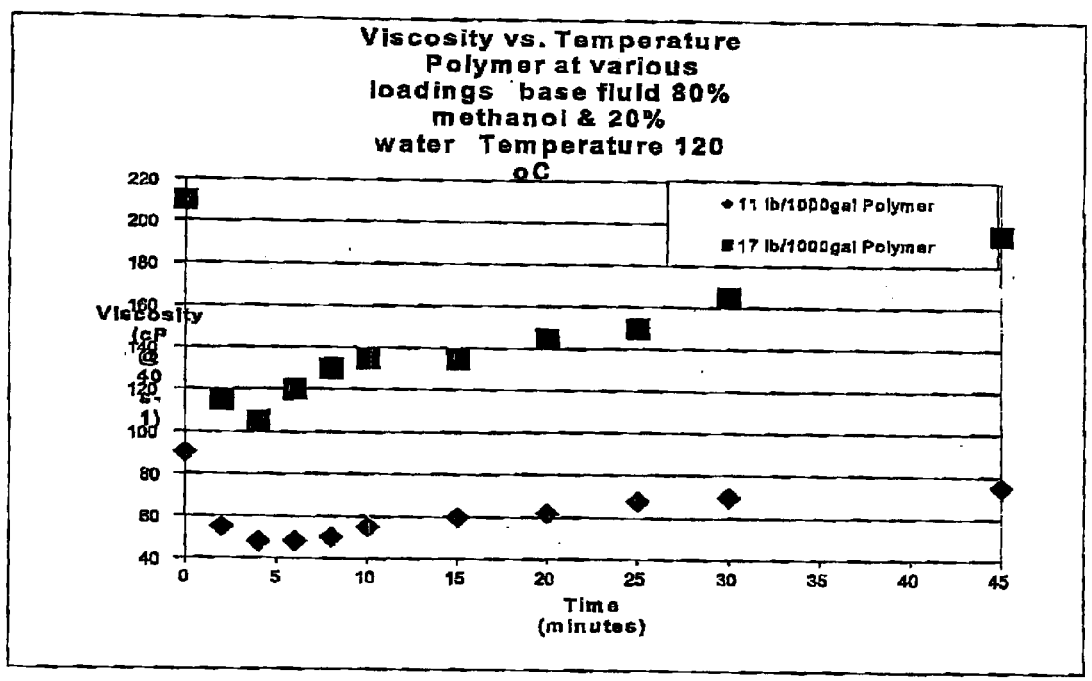
FIG. 2 is a comparative plot of viscosity against time for two examples of the fluid of the present invention.

To improve post fracturing fluid recovery, it is sometime desirable to emulsify the fracturing fluid of the present invention.

That is, the addition liquid carbon dioxide ($CO_2$) can dramatically improve the flow back characteristics of fracture fluids especially in under pressured reservoirs. Not only is the amount of fluid required for the job reduced, the hydrostatic head of the well bore fluid is lowered and the well can flow on it's own. High pumping pressures will compress Nitrogen bubbles during placement of the stimulation treatment only to expand when pressures are bled off and the treatment is flowed back.

Liquid $CO_2$ is pumped as a liquid and returns to surface as a gas. The thermodynamic properties of liquid $CO_2$ make it a unique fluid for fracturing. The fluid is pumped at temperatures of approximately −15 deg C. and it remains as a critical fluid (single phase) while the fracture is created and the proppant placed. Liquid $CO_2$ that leaks off from the fracture quickly rises to reservoir temperature, increasing its specific volume and becoming more like a gas. When the pressure is dropped and the well is flowed the single phase fluid returns to surface as $CO_2$ vapor. Since $CO_2$ is soluble in water, it has superior flow back characteristics. Carbonated fracture fluid will flow back much easier than $N_2$ systems where phase segregation has occurred.

An emulsion fracture treatment consists of carbon dioxide (typically 75%) dispersed as small bubbles throughout a continuous liquid phase. In traditional emulsions, the liquid phase contains surfactant and gellants to prevent coalescence and resulting phase separation. Foam quality (amount of liquid $CO_2$) should range from 52 to 95% (ratio of $CO_2$ volume to foam volume). Above 95% the mixture is essentially a mist with the $CO_2$ becoming the continuous phase. Below 52% there is no bubble-to-bubble interference and therefore a stable emulsion does not exist. Above 52% the $CO_2$ concentration is high enough for the bubbles to interfere and deform, thereby imparting resistance to shear and increasing the viscosity of the fluid system.

Unlike a conventional emulsion that uses a long chain or highly cross linked polymer to viscosify, the continuous, so called liquid phase, the present invention uses hydrated mid-molecular weight polymers, that provide sufficient viscosity, but do not, because of their discrete particulate structure, interfere with foam structure, resulting in a stable flowable foam with unexpectedly high viscosity.

Combined with liquid $CO_2$, emulsion viscosities are generated as a function of foam quality and the fluid system develops all of the properties desired for a fracture fluid system. The use of a surfactant such as an ethoxylated alkylphenol also produces a fluid with strong foaming tendencies that aids the return of liquids from the reservoir when foamed with the producing hydrocarbon gas.

Field Set Up

The required volume of liquid is located on lease in either a tank(s) or tank truck(s). The fracturing blender is connected to the liquid source through appropriate hoses (during a treatment, liquid such as methanol, fresh water or a combination thereof is taken from the tank). A proppant supply source is located at the blender to deliver the required proppant (delivered into the blender mixing tub at designed rates). High-pressure pump(s) are located adjacent to the blender and connected to the blender with the appropriate hoses. The discharge of the high-pressure pumps is through high pressure fracturing line to the wellhead. As the liquid is pumped through the blender, the viscosifier and breaker are added at the required concentration (as per treatment design program or field tests). Samples are taken to ensure that the resulting mixture has the required viscosity. After the "Hole Fill/Pad", proppant is added to the mixture at increasing concentrations up to the design level and quantity. When all the proppant has been pumped, the "Flush" fluid is pumped. At the end of flush, the fluid pumping stops. At this time, all the desired fluid and proppant volume is placed within the formation. The well is shut in for a predetermined time to allow the fracture to begin to heal and the fluid to break. Flow back is initiated as per the design program. Flow back continues until the Oil/Gas Company decides to shut in the well. Once flow back is complete, the Oil/Gas Company will evaluate the well and analyze the success of the stimulation treatment. It is not uncommon to observe 5–10 fold increases in hydrocarbon production from the stimulated well.

EXAMPLES

With depths ranging from 224–1725 mKB, the stimulation treatments have focused on Cretaceous sandstones that range in reservoir pressure from 2–7 kPa/m. Fracture fluid cleanup has been reported as superior to fluids utilizing conventional polymer base gels that utilize methanol content no higher than 40%. Some of the stimulated reservoirs include the Belly River, Notikewin, Dinosaur Park, Bad Heart, Viking, Second White Specks, Chinkeh, Jean Marie, Medicine Hat, Battle River, Mannville, and Bow Island. Gas production from these reservoirs varies from 1400 m$^3$/day to over 56,000 m$^3$/day. Wells with uneconomic gas production are classified as having reservoirs with very poor reservoir quality. In general, results are very positive with regard to the fast clean-ups and initial production. Also, these examples represent experimental stimulation work to date and do not suggest any limitations on the potential for usage on other gas-bearing reservoirs.

TABLE 1

Typical Treatments

| Job Type | Location Frac Gradient | Formation Depth | Average Rate Ave. Pressure | Proppant Vol. Max Conc. |
|---|---|---|---|---|
| CWS 300 | 37-03W4 20 kPa/m | Edmonton 569 mKB | 4.2 m³/min 11.1 MPa | 4.1 tonne 512 kg/m³ |
| CWS 300 | 61-17W5 16 kPa/m | Notikewin 1701 mKB | 3.8 m³/min 25.0 MPa | 12.6 tonne 540 kg/m³ |
| CWS 300 | 14-19W4 25 kPa/m | Belly River 395 mKB | 4.5 m³/min 8.8 MPa | 9.8 tonne 614 kg/m³ |
| CWS 300 | 94-0-11 19 kPa/m | Chinkeh 1462 mKB | 4.1 m³/min 18.0 MPa | 9.8 tonne 2520 kg/m³ |

TABLE 2

Post Fracture Flow Rate Comparison

| Job Type | Location | Zone | Proppant Placed | Normalized Flow Rate |
|---|---|---|---|---|
| Cross-linked Borate | d-35-G | Chinkeh | 14.7 Tonne | Too Small To Measure |
| Present system | c-99-11 | Chinkeh | 2.5 Tonne | 90,421 m³day |

What is claimed is:

1. A fracturing fluid comprising a polar base, 0.1–5.0% of a mid-molecular weight polyacrylate, an activator for ionizing said polyacrylate to a hygroscopic state and a breaker in an amount of 0.1–1.0% wt, wherein said breaker is NaCl or KCl.

2. A fracturing fluid comprising a polar base, 0.1–5.0% of a mid-molecular weight polyacrylate, and an activator for ionizing said polyacrylate to a hygroscopic state, wherein said polyacrylate is a polyacrylic acid polymer cross linked with polyalkenyl ethers or di-vinyl glycol.

3. A fluid as claimed in claim 2, wherein said polyacrylate is present in particles of about 0.2 micron diameter.

4. A fluid as claimed in claim 3, wherein said fluid is provided with 0.1–5.0% (wt) of an activator to initiate hydration of said polyacrylate.

5. A fluid as claimed in claim 4, wherein said activator is selected from triethanolamine, NaOH, KOH and $NH_4OH$.

6. A fluid as claimed in claim 5, further including a breaker in an amount of 0.1–1.0% wt.

7. A fracturing fluid comprising a polar base, 0.1–5.0% of a mid-molecular weight polyacrylate, an activator for ionizing said polyacrylate to a hygroscopic state, and
a breaker wherein said breaker is encapsulated.

8. A fluid as claimed in claim 7, wherein said breaker is an organic or inorganic salt.

9. A fluid as claimed in claim 8, wherein said breaker is NaCl or KCl.

10. A fluid as claimed in claim 7, wherein said polar base is selected from the group consisting of water, methanol, ethanol, propanol and isopropanol.

11. A fluid as claimed in claim 7, emulsified with liquid $CO_2$ or $N_2$ and a surfactant.

12. A fluid as claimed in claim 11, emulsified with liquid $CO_2$ in an amount of 50–52% to 94–95% (volume).

13. A fluid as claimed in claim 11, wherein said surfactant is an ethoxylated alkylphenol.

14. A fluid as claimed in claim 10, containing up to 50% $N_2$ or $CO_2$.

15. A fracturing fluid consisting essentially of a polar base, 0.1–5.0% of a mid-molecular weight polyacrylate, an activator for ionizing said polyacrylate to a hygroscopic state, and a breaker in an amount of 0.1–1.0% wt, wherein said breaker is NaCl or KCl.

16. A fluid as claimed in claim 15, wherein said polar base is selected from the group consisting of water, methanol, ethanol, propanol and isopropanol.

17. A fluid as claimed in claim 16, emulsified with liquid $CO_2$ or $N_2$ and a surfactant.

18. A fluid as claimed in claim 17, emulsified with liquid $CO_2$ in an amount of 50–52% to 94–95% (volume).

19. A fluid as claimed in claim 17, emulsified with liquid $CO_2$ in an amount of 52% to 95% (volume).

20. A fluid as claimed in claim 17, wherein said surfactant is an ethoxylated alkylphenol.

21. A fluid as claimed in claim 16, containing up to 50% $N_2$ or $CO_2$.

22. A fluid as claimed in claim 15 wherein said polyacrylate is a polyacrylic acid polymer cross linked with polyalkenyl ethers or di-vinyl glycol.

23. A fluid as claimed in claim 22, wherein said polyacrylate is present in particles of about 0.2 micron diameter.

24. A fluid as claimed in claim 23, wherein said fluid is provided with 0.1–5.0% (wt) of an activator to initiate hydration of aid polyacrylate.

25. A fluid as claimed in claim 24, wherein said activator is selected from triethanolamine, NaOH, KOH and $NH_4OH$.

26. A fluid as claimed in claim 25, wherein said breaker is encapsulated.

27. A fluid as claimed in claim 1 wherein said polyacrylate is a polyacrylic acid polymer cross linked with polyalkenyl ethers or di-vinyl glycol.

28. A fluid as claimed in claim 27, wherein said polyacrylate is present in particles of about 0.2 micron diameter.

29. A fluid as claimed in claim 28, wherein said fluid is provided with 0.1–5.0% weight of an activator to initiate hydration of said polyacrylate.

30. A fluid as claimed in claim 29, wherein said activator is selected from triethanolamine, NaOH, KOH and $NH_4OH$.

31. A fluid as claimed in claim 29, wherein said breaker is encapsulated.

32. A fluid as claimed in claim 1, wherein said polar base is selected from the group consisting of water, methanol, ethanol, propanol and isopropanol.

33. A fluid as claimed in claim 1, foamed with liquid $CO_2$ or $N_2$ and a surfactant.

34. A fluid as claimed in claim 33, foamed with liquid $CO_2$ in an amount of 50–52% to 94–95% (volume).

35. A fluid as claimed in claim 33, foamed with liquid $CO_2$ in an amount of 50–95% (volume).

36. A fluid as claimed in claim 33, wherein said surfactant is an ethoxylated alkylphenol.

37. A fluid as claimed in claim 1, containing up to 50% $N_2$ or $CO_2$.

38. A fluid as claimed in claim 6, wherein said breaker is an organic or inorganic salt.

39. A fluid as claimed in claim 38, wherein said breaker is NaCl or KCl.

40. A fluid as claimed in claim 38, wherein said polar base is selected from the group consisting of water, methanol, ethanol, propanol and isopropanol.

41. A fluid as claimed in claim 39, foamed with liquid $CO_2$ or $N_2$ and a surfactant.

42. A fluid as claimed in claim 41, foamed with liquid $CO_2$ in an amount of 50–52% to 94–95% (volume).

43. A fluid as claimed in claim 41, foamed with liquid $CO_2$ in an amount of 52–95% (volume).

44. A fluid as claimed in claim 41, wherein said surfactant is an ethoxylated alkylphenol.

45. A fluid as claimed in claim 2, containing up to 50% $N_2$ or $CO_2$.

46. A fracturing fluid comprising a polar base, 0.1–5.0% of a mid molecular weight polacrylate, an activator for ionizing said polyacrylate to a hygroscopic state wherein said fluid is emulsified with liquid $CO_2$, or $N_2$ and a surfactant.

47. A fluid as claimed in claim 46, emulsified with liquid $CO_2$ in an amount of 50–52% to 94–95% (volume).

48. A fluid as claimed in claim 46, emulsified with liquid $CO_2$ in an amount of 52% to 95% (volume).

49. A fluid as claimed in claim 46, wherein said surfactant is an ethoxylated alkylphenol.

50. A fluid as claimed in claim 49, wherein said polyacrylate is a polyacrylic acid polymer cross linked with polyalkenyl ethers or di-vinyl glycol.

51. A fluid as claimed in claim 50, wherein said polyacrylate is present in particles of about 0.2 micron diameter.

52. A fluid as claimed in claim 51, wherein said fluid is provided with 0.1–5.0% (wt) of an activator to initiate hydration of said polyacrylate, wherein said activator is selected from triethanolamine, NaOH, KOH and $NH_4OH$.

53. A fluid as claimed in claim 52, additionally comprising a breaker.

54. A fluid as claimed in claim 53, wherein said breaker is encapsulated.

55. A fluid as claimed in claim 54, wherein said breaker is an organic or inorganic salt.

56. A fluid as claimed in claim 55, wherein said breaker is NaCl or KCl.

57. A fluid as claimed in claim 56, wherein said polar base is selected from the group consisting of water, methanol, ethanol, propanol and isopropanol.

\* \* \* \* \*